Patented Feb. 8, 1944

2,341,239

UNITED STATES PATENT OFFICE 2,341,239

POLYMERIZATION PROCESS

Joseph Henry Percy, New York, and John Ross, Manhasset, N. Y., assignors to Colgate-Palmolive-Peet Company, Jersey City, N. J., a corporation of Delaware No Drawing. Application December 28, 1940, Serial No. 372,192

13 Claims. (Cl. 260—407)

This invention relates to the preparation of polycarboxylic acids and their derivatives, and more particularly it relates to the preparation of relatively pure polycarboxylic acids, and relatively pure, more stable monocarboxylic acids from soaps of unsaturated aliphatic monocarboxylic acids.

Many methods of treating fatty acid soaps at increased temperatures have been disclosed but none of these methods has accomplished the preparation of valuable polycarboxylic acids and of more effective and stable fatty acids thereby. No mention of any polycarboxylic acids has been made in the prior art processes nor has there ever been described the improvements in the purer monocarboxylic fatty acids attained by the present process.

The process comprises the treatment of soaps of unsaturated aliphatic acids while in a fluid condition, at an elevated temperature sufficiently high that polymerization of an unsaturated acid soap takes place, preferably in the absence of liquid water and with agitation, for example by steam or other inert gas which will result in removal of unsaponified material from the saponified mass. The treated saponified material containing polymeric acid soaps is then acidified, and the non-polymerized acids separated from the polymerized acids, preferably by fractional distillation, to obtain valuable and usable polycarboxylic acids as well as pure and stable non-polymerized aliphatic acids, and in some cases lower molecular weight aliphatic acids and intermediate weight complex monocarboxylic acids. The polycarboxylic acids have great utility in the resin, plastic, paint and varnish arts which the mixture of treated or non-treated acids does not have. The non-polymerized acid materials are purer and give much more desirable soaps of higher deterging efficiencies.

The polymerization of the unsaturated acid soaps is advantageously effected by agitating for a substantial time a mass of molten anhydrous soap containing soaps of unsaturated acids in an inert atmosphere at a temperature specific for each material at which polymerization takes place at a substantial rate without decomposition or carbonization. This temperature is generally between about 250° and 400° C. and usually above 300° C. The substantially anhydrous soap is in a thinly fluid condition so that it may be thoroughly agitated by passing superheated steam or other inert gas through it, thus ensuring unifomity of temperature throughout the mass and preventing local overheating and decomposition. Blowing with steam serves not only to agitate the liquid mass, but also to assist in the vaporization and distillation of unsaponifiable materials contained or generated therein, and to blanket the mass and exclude air to prevent oxidation at the high reaction temperatures used. The soap product so obtained is at least in part polymerized and may be prepared substantially free from unsaponifiable material. The soap product, cooled before damage by oxidation, and preferably diluted with water, is acidified with dilute mineral acid to liberate the acids thereof. These acids in general have a much higher melting point than the acids of the soap before treatment.

The acids are then fractionated in order to separate the valuable polymeric acids in a usable form. The separation is advantageously effected by fractional distillation of the acids and/or their esters in any suitable apparatus with or without additional materials such as aliphatic, alicyclic, terpene and aromatic hydrocarbons, fatty acids, steam and/or the like. The absence of the non-saponifiables which have a very broad boiling range renders the separation of the acids by distillation more efficient. Before fractionation, the acids or their esters are usually washed with water to remove any inorganic acids and salts and they may then be dried. The distillation may be performed in a batch or continuous manner with or without flashing of the volatile fatty acids.

The soaps to be treated may be prepared in any manner. For example, unsaturated fatty acid material and alkali may be used and the soap formed in situ, or the unsaturated fatty material may be used in saponified form.

When starting with a previously prepared unsaturated acid soap, it is often advantageous before the polymerization reaction to treat the soap with a substantially immiscible hot aqueous caustic alkaline salt solution so as to separate glycerine, mercaptans, phenolic and lignin-like substances therefrom. It is also desirable to blow the hot soap mixture with steam or other inert gas to volatilize the unsaponifiable, lower boiling, odoriferous materials, before or after but preferably during this alkaline brine extraction. After settling, the soap may then be separated from the brine by any suitable method, thinned with water again, and washed with a fresh caustic alkaline brine of sodium chloride, sodium carbonate, sodium sulphate and/or the like. After the treatment of the soap with the caustic alkaline brine and with steam, the soap and the acids thereof are improved in color and odor, and are substantially free from glycerol, phenols and lignin materials. This previous removal of complex phenols and lignin material from the fatty acid soap prevents the finished soap from being discolored by decomposition products of these materials which might be formed during the subsequent high temperature polymerization treatment.

One way to perform the polymerization treatment is to maintain a body of some of the anhydrous soap material at the relatively high polymerization temperature desired, at which it is thinly liquid, and to add the rest of the raw material continuously or in successive additions at a rate not substantially greater than the rate at which it may be heated to the temperature necessary for fluidity and reaction and be maintained in the reaction zone for sufficient time to complete the desired polymerization with corresponding continuous or successive withdrawals of polymerized material. For example, fatty oil and alkali, or fatty acid soap, with water, may be raised to an elevated temperature under pressure and then be flashed into the chamber containing a substantial quantity of the anhydrous soap under polymerization treatment in order to remove water and volatile non-saponified materials therefrom. A corresponding amount of treated product is removed from the substantial quantity of polymerized material in the reaction zone.

Both the minimum temperature and time of reaction will vary with the particular unsaturated aliphatic material treated, and the presence or absence of catalytic agents. At a given reaction temperature, the polymerization takes place at a given rate, the rate being a function of the temperature. If temperatures near the minimum reaction temperature are employed, a longer time of treatment is generally required substantially to complete the polymerization reaction and in the case of vapor-separating to permit the substantially complete removal of unsaponifiable organic constituents. However, it has been found that at temperatures considerably above the minimum reaction temperature, there is a secondary reaction comprising a degradation of the polymers to valuable shorter chain aliphatic acids, usually monoolefinic, and desirable complex carboxylic acids, apparently mono-basic. As to the separation of unsaponifiable material, it is generally greater at higher temperatures, at higher vacua, and with injection of greater quantities of steam. For example, the optimum rate of polymerization of the soaps of the usual unsaturated fatty acids and other improvements with a minimum rate of secondary reactions or fissure of the polymers is generally obtained at temperatures between about 300° and 350° C. In some cases, however, temperatures in excess of 350° C. may be required with the less reactive unsaturated acids, and for very reactive acids such as tung oil acids, and fish oil acids, temperatures as low as 250° to 275° C. are desirable. The ease of polymerization depends to a large extent on the location of the double bond in the carbon chain and the number of carbon atoms in the unsaturated carboxylic acids. It has been found that, in the case of soaps of acids of eighteen carbon atoms, the double bond in the nine position is resistant to polymerization as compared to the high reactivity of the double bond in the twelve position. However, these eighteen carbon atom acids with the double bond in the nine position will co-polymerize readily with other acids having a double bond in other positions.

Various alkaline materials may be used for the saponification, including caustic alkalies (caustic soda or potash), lime, carbonated alkalies (soda ash or potassium carbonate), limestone, marble dust, magnesium carbonate, dolomite, etc., or mixtures thereof. Soda ash is preferred because it is inexpensive and effective. It may be necessary to change the temperatures used if other alkaline materials than caustic soda and/or soda ash are used, because of the differences in the melting points of the soaps formed with metals other than sodium. In any event, the temperature should be sufficiently high to insure the necessary fluidity. The hot anhydrous soaps of the polymerized product may be cooled on rolls to form a flake or be sprayed with or without water in a suitable tower in the substantial absence of free oxygen to yield a grain or bead. The hot anhydrous soap may be added to water or soap solution in order to obtain a cooled hydrated soap or soap solution. The soap in any form is treated with dilute acid such as sulphuric acid to free the acids. The organic acids are decanted from the aqueous-acid layer and any sludge. The organic acids are washed with water either in a batch or in a countercurrent flow in a tower. They are then dried and are ready for fractionation.

One means of fractionating comprises rapidly heating the material containing the polymerized acids and/or their esters in a heater or pipe still. The temperature of the heater is preferably controlled so as to raise the temperature of the acids as they pass therethrough to substantially 275° to 325° C. as rapidly as possible within several minutes. The temperature and pressure are dependent, to a large extent, upon the nature of the particular polymerized acids and non-polymerized acids and/or their esters being treated. Steam, preferably superheated, may be added to the acids during the heating process in order to assist in the subsequent vaporization. Thermal decomposition is substantially prevented by application of the heat for only the short period required to reach the fractionation temperature by means of a pipe still.

The acid or ester vapors issuing from the heater at a temperature of about 250° to 300° C. pass into a flash chamber preferably at a reduced pressure of about 5–10 mm. In this apparatus the unvolatilized portion, mainly polymerized material, is separated from the volatilized portion and drops to the bottom of the flash chamber. Steam superheated to the heater outlet temperature may be passed into the bottom of the flash chamber for stripping purposes. If desired, a number of plates may be included below the heater vapor outlet so as more effectively to strip the bottoms of volatile materials. The polymerized acid materials may be withdrawn from the bottom of the flash chamber and may be further fractionated by distillation or other means. Baffles may be placed in the vapor path in order to remove entrained unvaporized materials from the volatile acid or ester vapors.

A number of fractionating systems are possible but a series of individual fractionating columns is preferred because the boiling points of some of the fatty acids or their esters that are desired to be separated lie very close together and it has been found that distillation scheme is preferable to the use of only one tower containing many bubble plates. The number of columns required is equal to the number of cuts desired less one.

Thus the vapors issuing from the flash chamber are passed into a suitable column supplied with superheated bottom stripping steam. In this column bottoms are removed and an overhead cut is removed. Reflux is supplied by means of a partial condenser located at the top of the column. The cooling medium for this condenser may be charging stock already raised in temperature by passage through the partial condensers connected to the succeeding columns that are operated at successively lower temperatures. In this manner the overall thermal efficiency may be greatly increased. The stripped bottoms discharged from this column are sesquimers or partial degradation products of certain of the polymerized acids or the corresponding esters, and are free from the mixture of non-polymerized fatty acids or esters comprising the overhead from this column. These organic acids, if formed, are apparently in part complex high molecular weight monocarboxylic acids containing more than about eighteen carbon atoms.

In the succeeding column the now polymer-free mixture of fatty acids or esters is separated. By proper control of the individual reflux ratios and bottom steam ratio, taking also into consideration the effectiveness of the column, it is possible to cut the mixture of fatty acids or esters into very narrow boiling fractions. A certain amount of novel lower molecular weight monoolefinic acids containing about five to twelve carbon atoms or the esters thereof are obtained as the lower boiling product in the latter stages. A high vacuum may be maintained on the entire system by any suitable means, as for example a steam jet and a barometric condenser.

Another procedure is to separate the mixture by passing the vapors issuing from the flash chamber into a bubble plate fractionating tower. The vapors of the acids or esters, entering the fractionating tower which maintains a suitable reflux, may be separated by reason of their different boiling points into relatively pure fractions of polymerized and non-polymerized fatty acids or esters. The hot liquid acids or esters may be drawn from various plates in the tower which contain the largest percentage of individual acids or esters and are passed into individual reboilers. Steam superheated to the proper temperature is passed into the bottom of the reboiler where the feed is stripped of the more volatile portions, which vapors are returned to the column. The liquid withdrawn from the stripper may be fairly pure acids or esters thereof. A more complete separation, of course, may be obtained upon further fractionation. If desired, portions of certain of these lower boiling fractions may be returned to the feed to raise the vapor pressure of the original mixture.

The liquid drawn from the bottom of this fractionating column consists primarily of relatively pure complex partial degradation products of polymeric acids or esters. In order to facilitate fractionation, a current of steam is passed into the column from an open steam coil positioned in the bottom of the fractionating column. From the upper bubble plate of the fractionating column the vapors, consisting principally of steam and a fatty acid or ester, pass through a reflux condenser which furnishes sufficient reflux for the desired fractionation. The non-condensed vapors pass through a line into a vapor condenser wherein the temperature is so regulated that practically all of the fatty acid or ester vapors is liquefied and the steam is left in the vapor state.

The fatty acid or ester liquefied in the condenser is substantially pure. Any fatty acids or esters in the steam are removed by passing the steam around suitable baffles or other entrainment device whereby the particles of fatty acid or esters are removed. In either procedure, the steam freed from its suspended fatty acid material is preferably passed through an ejector to a barometric condenser which serves to maintain the entire system under a suitable reduced pressure.

It should be noted that, although it is preferred to flash into the flash chamber, in some instances it may be desirable to flash the acids or esters directly into the first or only fractionating tower. The process may be conducted in a continuous manner or it may be carried out in a batch procedure.

It is often advantageous to effect separation of the polymeric acids from the non-polymerized acids by esterifying the acids in the presence of inorganic acids such as sulphuric acid or hydrochloric acid with one or more alcohols such as methyl alcohol, ethyl alcohol and butyl alcohols, and freeing the resulting esters of inorganic material. The esters of the acids differ appreciably in physical properties and often may be more readily separated than the original mixture of acids. The separation is preferably by fractional distillation with or without additional materials, as noted hereinbefore. By operating with the lower alkyl esters and at exceptionally high vacuum, e. g., 1 mm. pressure, it is then possible to vaporize and distill the polymeric material which is not usually possible with the free acids.

Other methods of fractionation of the acids or the esters, which methods are somewhat less satisfactory include, (1) fractional crystallization from acetone or similar solvents, (2) partial neutralization and separation of the mixture by steam distillation or extraction, and/or (3) solvent extraction. The previous removal of unsaponifiables here again improves the processes of separation to an unexpected degree.

The polymerized acids and esters are light in color, have a pleasant odor, and may be obtained in a relatively pure state. These polymerized materials alone or along with other materials such as phthalic acid, maleic acid and drying oils, can be reacted with monohydric alcohols, polyhydric alcohols, and/or phenols such as methyl alcohol, ethyl alcohol, butyl alcohol, lauryl alcohol, cetyl alcohol, glycol, glycerol, sorbitol, mannitol, erythritol, phenol, resorcinol and/or cresol to form synthetic resins, plasticizers and the like for use in preparing coating compositions, fibers, films and other plastic compositions.

The non-polymerized acids may be used for any purpose such as soap making, candle making, food products or the like. It has been found that these acids, freed of the more reactive, less stable acids and of the unsaponifiable materials, produce unusually stable glyceride food products and soaps even from oils and fats not normally considered as possible sources of acids for these purposes.

*Example I*

500 parts by weight of undecylenic acid having an iodine value of 133 is reacted with slightly over the equivalent weight of sodium carbonate by slowly adding the former to the latter in a vapor separating chamber while blowing with steam at a temperature about 250° to 300° C. When saponification is complete, the temperature is raised to 350° C. and the steam treatment is continued for one hour. The fused molten soaps are cooled, hydrated and dissolved by adding the hot soap to hot water. The solution is acidified with dilute sulphuric acid to free the organic acids. The acids are extracted from the aqueous acid solution with petroleum ether. The ether solution of acids is washed with water, dried with calcium chloride and the solvent is then distilled off. The organic acids are esterified by refluxing with 3 volumes of methanol containing 1% sulphuric acid. Water is added and the esters are extracted from the aqueous layer with petroleum ether. The ether solution is washed with water, then with dilute sodium carbonate solution, and finally with water. After drying, the solvent is distilled off. The esters are distilled to obtain two major fractions, which can be converted to the following acid fractions: about 45% of a methyl ester of a monomeric (apparently unchanged) undecylenic acid, and over 50% of methyl esters of polymeric undecylenic acid (dimers and trimers) fractions having iodine values ranging between about 35-60, molecular weight 400-600, saponification equivalent 200, and boiling point of methyl esters of about 200-365° C. at 2 mm.

*Example II*

The process of Example I is conducted on linoleic acid having an iodine value of 171 at a temperature of 350° C. for about one hour. The yield of esters is about 20% of apparently unchanged esters (B. P. of methyl esters 165°-185° C. at 2 mm.); about 50% of dimeric esters (B. P. of methyl esters 270°-310° C. at 2 mm.) having an iodine value of 80, molecular weight about 580, and a saponification equivalent of 300; about 7% of complex esters (B. P. of methyl esters 185°-270° C. at 2 mm.) having an iodine value between about 90-110, molecular weight about 400 and saponification equivalent of 310; and about 10% of low boiling unsaturated aliphatic acids (B. P. of methyl esters below 165° C. at 2 mm.).

*Example III*

The process of Example I is conducted on linseed oil at a temperature of 300° C. for about one hour.

About 30% of the esterified material is a mixture of esters of the unchanged and lower boiling monomeric acids. The yield of esters of dimeric acid is about 25% and of esters of higher polymeric acids is about 20%. About 7% of an intermediate fraction of complex monocarboxylic acid esters having a molecular weight between the monomeric and dimeric material is also obtained. The boiling points of the esters of the various fractions from the eighteen carbon atoms acids are about the same as those given in Example II.

*Example IV*

Tung oil is treated by the process of Example I for about thirty minutes at a temperature between 250° and 300° C. The yields are as follows:

30% low and monomeric acid esters
10% intermediate acid esters
35% dimeric acid esters
20% high polymeric acid esters

*Example V*

U. S. P. oleic acid, a mixture of about 5-10% linoleic acid and 95-90% of oleic acid, is treated by the process of Example I at a temperature of about 325° to 350° C. for about three hours. About 15% of esters of dimeric acids having an iodine value of 57.5, about 5% of esters of complex intermediate acids, and about 75% of esters of monomeric and lower boiling acids. The quantity of polymeric material and the iodine value of the dimeric material indicates the formation of copolymers of oleic and linoleic acid.

*Example VI*

To demonstrate the application of the process to potential unsaturated acids, the process of Example I is applied to dibromoleic acid (9-10 dibromstearic acid) with excess alkali to dehydrobrominate the soap at a temperature of 280° C. for about two hours. The yields are as follows:

30% of dimeric acid esters (I. V. of 67)
15% of higher boiling ester material
10% of intermediate acid esters
7% of lower boiling acid esters
33% of monomeric $C_{18}$ acid esters

*Example VII*

The process of Example I is applied to castor oil at a temperature of about 350° C. for about two hours. During the process there is some conversion of ricinoleic acid soap to undecenoic acid soap, which is polymerized by the process, as well as direct reaction of the ricinoleic acid soap. A substantial quantity (about 20%) of water-insoluble volatile distillate (apparently aldehyde and ketone) is formed during the polymerization treatment. About 60% polymeric acid ester having a boiling point above 250° C. at 2 mm. pressure and an iodine value of 52 is obtained. About 7% of a low boiling (apparently monomeric) carboxylic acid ester having a boiling point below 135° C. at 2 mm. and an iodine value of 50 is also recovered. An ester fraction, mainly monomeric, comprising about 30% of the mixture having a boiling range between 135° and 250° C. at 2 mm. and an iodine value of 55 is also obtained.

Among the unsaturated materials (which term includes substances which give rise to unsaturated materials in the process) which may be treated by the present procedure are linseed oil, cottonseed oil, China-wood oil, sunflower oil, safflower oil, sesame oil, maize oil, rape oil, arachis oil, soya bean oil, perilla oil, corn oil, oiticica oil, fish oils such as shark oil, whale oil, menhaden oil and sardine oil, animal grease, cottonseed foots, garbage grease, castor oil, olive oil, wool fat, shellac, the corresponding halogen and hydroxy derivatives thereof and numerous other unsaturated including potentially unsaturated fatty acids, esters, waxes, oils and fats as well as the individual fatty acids therein such as linoleic acid, undecylenic acid, linolenic acid, palmitoleic acid, clupanodonic acid, brassidic acid, chaulmoogric acid, erucic acid, linolic acid, iso-oleic acid, alpha and beta elaeostearic acid and their halogen and/or hydroxy derivatives. Although any unsaturated aliphatic carboxylic acid salts may be polymerized by the present process either alone or with other unsaturated salts, it is preferred to employ unsaturated monocarboxylic acids having at least six carbon atoms.

Other materials may be present during the treatment such as saturated fatty acids including stearic acid, palmitic acid, myristic acid, lauric acid, behenic acid, caproic acid, capric acid, caprylic acid and nonanoic acid, fatty oils, waxes and fats, rosin, but generally it is preferred to operate in the absence of excess constituents which may adversely affect the separation of the polymerized acids and non-polymerized acids if present after the treatment. When it is desired completely to polymerize the particular material, it may be desirable to admix a less reactive unsaturated acid soap or saturated acid soap, preferably a lower melting soap, with the material to undergo polymerization in order that suitable fluidity of the final product during the last steps of the polymerization may be obtained.

As many widely different embodiments of this invention may be made without departing from the spirit and scope thereof, it is to be understood that this application is not limited to the specific proportions or embodiments herein disclosed except as defined in the following claims.

We claim:

1. The process which comprises heating, in an inert atmosphere and in the presence of excess alkali, an anhydrous salt of an unsaturated carboxylic acid to a temperature above 300° C. but not greater than 400° C. and above the melting point but below the decomposition temperature of the salt in the anhydrous state to cause polymerization to take place, acidifying the treated salt to obtain the corresponding organic acids, and fractionating the acid material to separate and recover the polymerized unsaturated carboxylic acid material.

2. The process which comprises heating, in an inert atmosphere, anhydrous salts of a mixture of carboxylic acids containing unsaturated acids at least one of which is polymerizable to a temperature above 250° C. but not greater than 400° C. and above the melting point but below the decomposition temperature of the salts in the anhydrous state to cause polymerization to take place, acidifying the treated salts to obtain the corresponding organic acids, and fractionating the acid material to separate and recover the polymerized unsaturated carboxylic acid material.

3. The process which comprises heating, in an inert atmosphere, an anhydrous salt of a polymerizable unsaturated carboxylic acid to a temperature between 250° and 400° C. at which polymerization takes place and above the melting point but below the decomposition temperature of the salt in the anhydrous state while blowing with an inert gas, acidifying the treated salt to obtain the corresponding organic acids, esterifying the acids with a lower monohydric aliphatic alcohol having not more than four carbon atoms and fractionating the acids as esters to separate and recover the polymerized unsaturated carboxylic acid material.

4. The process which comprises heating, in an inert atmosphere, an anhydrous salt of a polymerizable unsaturated carboxylic acid to a temperature between 250° and 400° C. at which polymerization takes place and above the melting point but below the decomposition temperature of the salt in the anhydrous state while blowing with steam, acidifying the treated salt to obtain the corresponding organic acids, esterifying the acids with a lower monohydric aliphatic alcohol having not more than four carbon atoms and fractionating the acids as esters to separate and recover the polymerized unsaturated carboxylic acid material.

5. The process which comprises reacting, in an inert atmosphere, unsaturated carboxylic acid material of the class consisting of acids and esters, with a saponifying agent, heating the soap formed, in the absence of liquid water to a temperature between 250° and 400° C. and above the melting point but below the decomposition point of the soap in an anhydrous state to cause polymerization to take place and while blowing with an inert gas, acidifying the resulting treated soap to obtain the organic acids, and fractionating the acid material to separate and recover polymerized unsaturated carboxylic acid material.

6. The process which comprises heating in an inert atmosphere an anhydrous salt of a polyolefinic fatty acid to a temperature above 250° C. but not greater than 400° C. at which polymerization takes place and above the melting point but below the decomposition temperature of the salt in the anhydrous state, acidifying the treated salt to obtain the corresponding organic acids, and fractionating the acid material to separate and recover the polymerized unsaturated carboxylic acid material.

7. The process of obtaining purified acids from mixtures thereof which comprises heating, in an inert atmosphere and under anhydrous conditions salts of a mixture of polyolefinic and monoolefinic fatty acids to a temperature above 250° C. but not greater than 400° C. at which polymerization takes place and above the melting point but below the decomposition temperature of the salts in the anhydrous state, acidifying the treated salts to obtain the corresponding organic acids, and fractionating the acid material to separate and recover the polymerized material from the purified and non-reacted acid material.

8. The process which comprises heating, in an inert atmosphere, and under anhydrous conditions salts of linoleic and oleic acids to a temperature above 250° C. but not greater than 400° C. at which polymerization takes place and above the melting point but below the decomposition temperature of the salts in the anhydrous state, acidifying the treated salts to obtain the corresponding organic acids, and fractionating the acid material to separate and recover the co-polymerized acid material from the purified and non-reacted portion of oleic acid material.

9. The process which comprises heating, in an inert atmosphere, anhydrous alkali metal salts of acids of a fish oil to a temperature above 250° C. but not greater than 400° C. at which polymerization takes place and above the melting point but below the decomposition temperature of the salts in the anhydrous state, acidifying the treated salt to obtain the corresponding organic acids, and fractionating the acid material to separate and recover the polymerized acid material and the purified, non-reacted, more saturated fish oil acid material.

10. In the production of polymerized unsaturated carboxylic acid material from unsaturated components of plant and animal oils and fats, the process which comprises saponifying the unsaturated components, treating the resulting soap in the molten anhydrous condition in an inert atmosphere at a temperature within the range of about 250° to 400° C. to cause polymerization, acidifying the treated soap to obtain the corresponding organic acids, and fractionating the acid material to separate and recover the polymerized unsaturated carboxylic acid material.

11. In the process of producing polymerized unsaturated carboxylic acid material by subjecting anhydrous salt of a polymerizable carboxylic acid to a temperature within the range of 250° to 400° C. and acidifying the treated salt to obtain the corresponding organic acids, the method of fractionating said acids which comprises heating the acids rapidly to 250° to 325° C. and separating the polymerized acids from unpolymerized acids by distillation.

12. In the process of producing polymerized unsaturated carboxylic acid material by subjecting anhydrous salt of a polymerizable carboxylic acid to a temperature within the range of 250° to 400° C. and acidifying the treated salt to obtain the corresponding organic acids, the method of fractionating said acids which comprises esterifying said acids with lower aliphatic alcohols having not over four carbon atoms, heating the esters rapidly to 250° to 325° C. and separating the polymerized esters from the unpolymerized esters by distillation.

13. The process of fractionating a mixture containing material selected from the group consisting of polymeric fatty acids and polymeric fatty acid esters with lower monohydric aliphatic alcohols having not more than four carbon atoms which comprises rapidly heating said mixture to a temperature within the range of 250° to 325° C. and separating said material from more volatile constituents in the mixture by flash distillation.

JOSEPH HENRY PERCY.
JOHN ROSS.